April 11, 1944.　　C. A. BREWER　　2,346,534
CONTROL SYSTEM FOR MOTOR VEHICLES
Original Filed Oct. 2, 1929
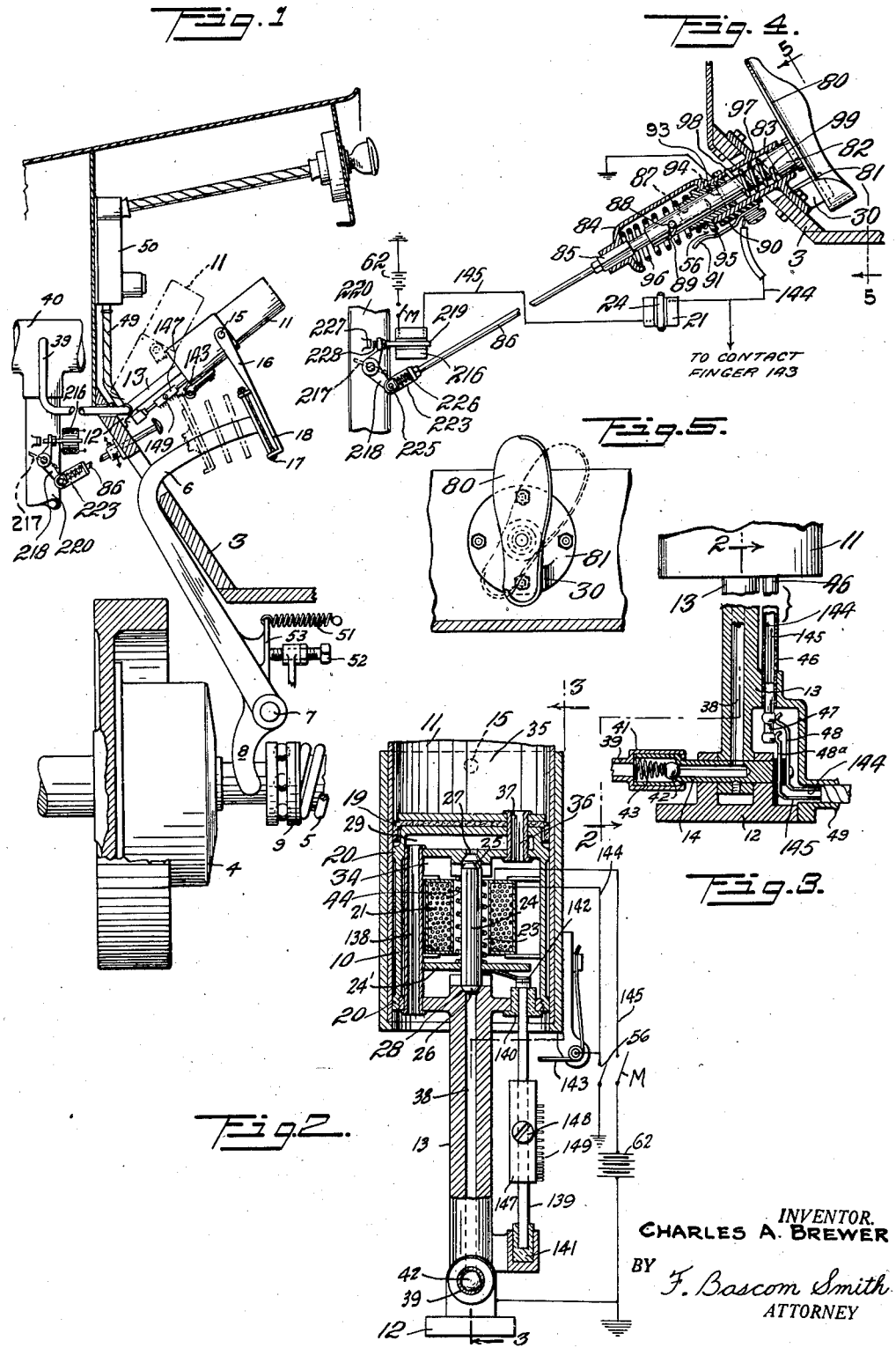
INVENTOR.
CHARLES A. BREWER
BY F. Bascom Smith
ATTORNEY Patented Apr. 11, 1944

2,346,534

UNITED STATES PATENT OFFICE 2,346,534

CONTROL SYSTEM FOR MOTOR VEHICLES

Charles A. Brewer, Noroton Heights, Conn., assignor of one-half to Philip J. Kury, Arverne, N. Y.

Original application October 2, 1929, Serial No. 396,691. Divided and this application January 17, 1944, Serial No. 518,650

18 Claims. (Cl. 192—.01)

This invention relates to motor vehicles or the like and more particularly to a safety control system for controlling the operation thereof whereby safety in operation and ease of control are materially enhanced.

This application is a division of my copending application, Serial No. 396,691, for "Safety control system for motor vehicles," filed October 2, 1929, and all subject matter contained in said copending application which is applicable to the disclosure of the present application is made a part hereof by reference.

One of the objects of the present invention is to provide an improved operating and control means for the clutch of a motor vehicle or the like.

Another object of the invention is to provide novel means for controlling the engaging movement of a motor vehicle clutch in accordance with the pressure in the intake manifold of the vehicle motor or other suitable source of subatmospheric pressure.

Another object of the invention is to provide novel means for controlling the power actuation of a clutch mechanism of a motor vehicle whereby safety is promoted, wear and tear on the vehicle and parts thereof are reduced, more uniform operation and control are attained, starting strains are reduced, and fatigue of the operator is materially lessened.

A further object is to provide an improved power control for a clutch whereby substantially no effort is required on the part of the driver in releasing the clutch and controlling the engagement thereof.

Still another object is to provide novel apparatus for actuating and controlling the engagement of a clutch of a motor vehicle or the like whereby a simulation of expert manual operation of the clutch is obtained.

Another object is to provide novel apparatus of the above character whereby positive uniform control of the clutch driving effort during the engaging period of the clutch parts may be obtained.

A still further object is to provide novel clutch actuating means which embodies a control device including the accelerator or throttle operating means of a vehicle.

Another object is to provide novel foot operated means for controlling both the clutch and the throttle of the motor vehicle or the like.

The above and further objects and novel features of this invention will more fully appear from the following detailed description taken in connection with the accompanying drawing. It is to be expressly understood, however, that the drawing is for the purpose of illustration only and is not designed as a definition of the limits of the invention, reference being primarily had for this latter purpose to the appended claims.

In the drawing, wherein like reference characters refer to like parts throughout the several views, Fig. 1 is a diagrammatic side elevation of a portion of the vehicle, partly in section and with parts broken away, illustrating one form of apparatus embodying the present invention;

Fig. 2 is a large scale side elevation of the clutch operating power device of Fig. 1, partly in section and with parts broken away, the section being taken on line 2—2 of Fig. 3.

Fig. 3 is a side elevation of said power device, partly in section and with parts broken away, said view being taken substantially on line 3—3 of Fig. 2.

Fig. 4 is a diagrammatic elevation, on an enlarged scale and partly in section, showing a portion of a control mechanism and electrical circuit for said power device and the engine throttle; and, Fig. 5 is a front elevation of the foot pedal shown in Fig. 4, the view being taken substantially along line 5—5 of Fig. 4.

One form of clutch operating mechanism which may be employed in carrying out the present invention is illustrated in Figs. 1 to 3, inclusive, wherein the clutch 4 of a motor vehicle, normally held in operative engaged position by spring 5, is adapted to be moved to disengaged position by the depression of a clutch pedal 6 of the type ordinarily provided for manual actuation of the clutch mechanism. Pedal 6 is pivotally mounted at 7 and is provided with a bifurcated portion 8 which is adapted to engage a bearing 9 for disengaging the clutch mechanism. A power device of the fluid pressure (vacuum) actuated type is provided for operating the clutch mechanism, said device being preferably attached directly to clutch pedal 6.

The power device comprises two relatively movable elements forming a fluid pressure chamber. In the illustrated form, said elements are constituted by a piston 10 and a cylinder 11 enclosing the piston, either of which may be movable. In the embodiment shown, the piston represents the stationary element and the cylinder is movable relative thereto in a manner and for a purpose to appear hereafter. A bracket 12 is mounted on the foot board 3 of the vehicle adjacent to pedal 6 for supporting the power device. Preferably, a stem 13 is connected at its upper end to bracket 12 by any suitable means such as a pivot pin 14. Cylinder 11 carries trunnions 15 on opposite sides thereof which are adapted for pivotal connection with a bracket arm 16 that may be clamped by any suitable means, as by bolts 17, to the head or foot rest 18 of clutch pedal 6. Therefore, as the cylinder moves, the clutch driving surfaces will be correspondingly shifted, the pivotal connections 14 and 16 permitting the power device to swing to compensate for the arcuate movement of head 18 about the pedal pivot 7.

The power device in the present instance is operated by suction from any suitable source, such, for example, as the intake manifold of the vehicle motor and said device is shown as being electrically controlled. Piston 10 may carry the usual cup leather 19 to prevent leakage past the piston and it is guided in cylinder 11 by the annular walls 20. The piston also carries a part of the control mechanism for the power device, said control mechanism comprising a solenoid 21 mounted in a chamber 34 in the piston and having a central opening 23 through which extends an armature 24 having valves 25 and 26 in opposite ends thereof to control openings 27 and 28, respectively, in the end walls of chamber 34. The interior of chamber 34 communicates with space 35 in cylinder 11 above piston 10 through one or more passages 36 in hollow rivets 37.

The opening 28 and valve 26 control communication between space 34 and a passage 38, extending longitudinally in stem 13 of piston 10, said passage being in constant communication with the hollow center portion of pivot pin 14 which is in turn connected through a suitable tubular connection 39 with a source of subatmospheric pressure or suction, such as the intake manifold 40 (Fig. 1) of the vehicle motor. A joint 41 permits relative turning movement between conduit 39 and pivot pin 14. This joint also serves as a means for carrying a check valve of any suitable type, such as ball 42, normally held against its seat by spring 43. As shown in Fig. 3, check valve 42, 43 is so arranged as to permit air to flow from passage 38 to the intake manifold but to prevent flow of air in the opposite direction.

A spring 44 embraces armature 24 and tends to shift the same downwardly to normally close valve 26, 28 and open valve 25, 27, said spring being interposed between the upper wall of chamber 34 and a plate or collar 24' on armature 24. Solenoid coil 21 is accordingly so constructed with relation to armature 24 that excitation thereof will raise the armature to close valve 25, 27 and open valve 26, 28. This will place passage 38 in communication with space 35 in cylinder 11 above piston 10 and cut the same off from communication with atmosphere, thereby connecting said space with intake manifold 40. The air in space 35 will accordingly be withdrawn through passages 36, space 34, passage 38 and conduit 39. Cylinder 11 and bracket 16 are thus moved downwardly relative to piston 10 by the pressure of the surrounding atmosphere to actuate clutch pedal 6 and thereby disengage the clutch mechanism.

Novel means are provided for controlling the connection of solenoid coil 21 to a source of electrical energy for the purpose of controlling the disengagement and engaging movement of the clutch driving surfaces. In the form shown, said means constitute a portion of the control means for the power device and comprise a supporting rod 139 mounted at one side of stem 13 and insulated from the other elements of the power device by the mountings 140 and 141 of insulating material. A spring contact 142 is connected to disc 24', which is carried by bar or armature 24, and is therefore continuously grounded through the power device. One end of solenoid coil 21 is connected to an insulated spring contact 143 through a lead 144, and the other end of the solenoid coil is connected through a lead 145 and a main cut-out switch M, which may be the ignition switch, to one terminal of a battery 62 or other suitable source of electrical energy. The other terminal of the battery or source may be grounded in the usual manner. Leads 144 and 145 are preferably led to the solenoid coil through a tube 46 which may be attached to piston 10 and stem 13, said leads being connected to spring finger 143 and battery 62, respectively, through a suitable jack 47. The lower end of the latter is contacted by a pair of spring contacts 48, 48a which may be considered as parts of leads 144 and 145, respectively. If desired, these leads may extend through a flexible protective cable 49 and a connection box 50, said box being mounted in any suitable position where it is easily accessible.

Any suitable control switch such, for example, as the switch 56, is connected in circuit with solenoid 21 and battery 62 through lead 144. This switch may, for example, take the form of the accelerator actuated switch 56 of Fig. 4 to be hereinafter described. Mounted on rod 139 is a block 147 which may be adjusted on the rod by means of an adjustment and securing screw 148. This block carries a series of projecting pins 149 which project from one side thereof in the path of movement of the spring finger 143 when cylinder 11 moves to disengage or engage the clutch.

It will, of course, be apparent that power device 10, 11 is normally in the full line position illustrated in Fig. 1, i. e., with cylinder 11 in its uppermost position, valve 25 being open and space 35 being in communication with atmosphere through passage 36, chamber 34, space 29 and tube 138. Clutch pedal 6 is thus also normally in raised position and the clutch parts in driving engagement. Upward movement of the clutch pedal and, hence, that of cylinder 11 under action of a suitable spring 51 is limited by an adjustable stop screw 52 carried by a stationary element of the vehicle frame and adapted to engage a lug 53 on pedal 6. Spring 51 is effective, when the clutch is engaged, to hold clutch pedal 6 in such a position as to prevent engagement between portion 8 of the pedal and the rotating bearing 9.

In the operation of the apparatus thus far described, assuming switch M to be in closed position, closing of the control switch indicated at 56 connects solenoid coil 21 in circuit with battery 62 to energize the coil. Upon energization of coil 21, armature 24 is electro-magnetically raised against the action of spring 44 to close valve 25 and open valve 26. This will cut off communication of chamber 35 with the atmosphere and will place it in communication with the source of suction, such as intake manifold 40 of the vehicle motor. The suction or sub-atmospheric pressure thus created in the chamber will cause the external pressure to move cylinder 11 downwardly to its lowermost position, indicated by dotted lines in Fig. 1. Cylinder 11 carries clutch pedal 6 with it to thereby release or disengage the clutch.

When the electrical circuit is broken by opening the switch 56, the valve 26 is closed by spring 44 and valve 25 is opened thereby cutting off chamber 35 from the source of suction and placing said chamber in communication with atmosphere. The cylinder and the pedal begin to immediately move rapidly upwardly under action of springs 9 and 51 until just before the clutch begins engagement. At this or any other desired point, finger 143 engages the lower pin 149, thus closing the circuit through the solenoid coil 21 to again close the valve 25 and open the valve 26. This immediately causes a resistance to upward movement of the cylinder and retards this movement until finger 143 passes off the first pin 149, thus breaking the circuit through the solenoid 21 and causing valve 26 to close and valve 25 to open. When finger 143 hits the next pin 149, the circuit to the solenoid is again closed. Thus, as the cylinder moves upwardly, valves 26 and 25 are alternately opened and closed by engagement of the finger 143 with the pins 149. By suitably spacing the pins 149, the rate of vibration or movement of valves 25 and 26 between the closed and opened positions or, that is, the timing between these movements, can be varied as desired to vary the effective vacuum resistance in the chamber 35 to control the engaging movement of the clutch. In other words, the speed of vibration of the valves controls the rate of inflow of air and therefore controls the vacuum resistance. It will also be seen that during the intervals when valve 26 is open the pressure or degree of vacuum in the intake manifold 40 or other source of suction will determine the amount of air withdrawn from chamber 35 and, hence, control the speed of the engaging movement in accordance with said pressure. This device therefore automatically controls the clutch engagement to provide a rapid engaging movement to substantially the point of initial clutch engagement, slow or retarded movement during actual engagement of the clutch surfaces and, if desired, additional rapid movement after the clutch surfaces are fully engaged.

In Figs. 4 and 5 there is illustrated another embodiment of a novel control system for a vehicle motor clutch comprising the power device of Figs. 1 to 3, said power device being represented in Fig. 4 by the solenoid 21, 24. Said system also includes a novel foot operated pedal for jointly controlling the power device and the throttle of the vehicle motor in a novel manner. It very often happens that when an accident is imminent the driver becomes excited and confused, especially if the conditions change very suddenly. If, under such circumstances, the driver has his foot on the accelerator, as in normal driving, his first impulse is to press downwardly with his foot since this is the movement which is used in applying the vehicle brakes. Many serious accidents have been caused by the driver pressing downwardly on the accelerator while thinking he had his foot on the brake pedal, so that instead of checking the speed of the car, it was increased. The control device of Figs. 4 and 5 will obviate this danger.

In the arrangement shown in Fig. 4, a solenoid coil 216 is operatively connected to the throttle valve 217 by means of a lever 218 and an armature 219. Thus, when the circuit is closed through the solenoid 216, it forces the armature 219 to the left (Fig. 4) and closes throttle valve 217 in the upright pipe 220 leading from the carburetor (not shown) to the intake manifold 40.

The throttle valve may be controlled in the usual manner through an accelerator pedal by the rod 86 but, in the form shown, this rod is connected to the throttle lever 218 by a slip link so that even when excited the operator cannot open the throttle by pressing on the accelerator while the circuit through the solenoid 216 is closed. Thus, the link 223 may have a longitudinally extending slot in which a pin 225 on the lever 218 may slide against the action of a spring 226. This spring is of sufficient strength to operate the throttle under normal foot operation, but is not sufficient to overcome the action of solenoid 216, 219 tending to close the throttle valve when the solenoid is energized. A stop 227 may be provided for cooperating with the end of armature 219 to limit closing movement of the throttle and said armature is adjustably mounted on lever 218 as indicated at 228 to adjust the limit of the closing movement.

For a novel purpose to hereinafter appear, rod 286 is connected in a novel manner with a foot pedal 80. The foot rest on pedal 80 is mounted for limited downward sliding movement in a bracket 81 bolted to the floor boards 3 and also for turning movements in the bracket. Thus, the pedal is mounted on a cylindrical support on shaft 82 which may turn in the bracket and also slide longitudinally in the bearing 83. An extension 84 of the bracket has a non-circular opening in which is mounted a similarly shaped guide 85 on rod 86. The guide 85 and the opening for it may, for example, be square or of any other non-circular shape so that the rod 86 may slide longitudinally but will be held against turning movement. The upward end of the rod extends into a passage or recess 87 in the reduced lower end of the shaft 82 and carries a radially extending pin 88 which projects into a curved cam slot 89 in shaft 82. This slot is so curved that when the foot rest 80 is turned to the right, or clockwise as viewed in Fig. 5, the wall of the slot will force the pin downwardly and with it the rod 286 to open the throttle valve indicated at 217.

Also mounted on the bracket 81 and insulated therefrom by an insulating plate 90 is a spring contact 91 connected through lead 144 to the solenoid coil 21 of the clutch releasing power device, as above described, and also to the solenoid coil 216 through lead 145. The other end of coil 216 may be connected through switch M to battery 62, one terminal of which is grounded, as described above in connection with Fig. 2. Although coils 21 and 216 are shown as being connected in series, either one may be used separately or independently of the other. The shaft 82 carries a metal collar 93 fixed thereon by any suitable means, such as pin 94. This collar carries an extension 95 normally out of contact with the spring contact 91 but may engage it under certain conditions presently to be described. Contacts 91 and 95 constitute the switch 56 heretofore described. A compression spring 96 reacts against collar 93 and the extension 84 to yieldably hold the shaft 82 and the foot rest in their uppermost position. This is a relatively heavy spring, the same having sufficient compression to support the normal weight of the operator's foot on foot rest 80 and therefore maintain the latter in its uppermost position.

Torsion spring 97 is connected at one end to the bracket 81 as indicated at 98 and at its other end to the shaft 82 as indicated at 99. This spring tends to turn the shaft counterclockwise, or to the left as viewed in Fig. 5, to close throttle 17, the movement in this direction being limited by any suitable stop 30 engaging one side of the foot rest. The spring 97 is merely of sufficient strength to turn the foot rest and shaft to this position and not place an undue strain on the foot of the operator.

In operation, the throttle is controlled by turning the foot rest 80 more or less to the right as indicated in dotted lines (Fig. 5) and the more it is turned in this direction, the further will the throttle be opened by action of the cam slot 89 on the pin 88. Thus, in this construction the opening of the throttle is not effected by a downward movement of the foot as in the ordinary construction. However, if the operator in the case of a threatened accident, should press downwardly on the accelerator, he would, instead of increasing the speed of the car, cause the throttle to be closed and throttle down the engine while also causing the clutch to be disengaged. This is accomplished by the downward movement of the shaft 82 which effects the closing of switch 56 by causing the extension 95 to engage the contact 91 to thereby close the circuit through the solenoids 21 and 216.

It will thus be seen that during operation of the vehicle the normal position of pedal 80 will be a position similar to that illustrated by dotted lines in Fig. 5. When pedal 80 is in the position illustrated or is moved back to the position illustrated in the drawing, i. e., an intermediate position, the throttle will be in idling position and the clutch will be engaged. When pedal 80 is depressed, switch 56 will be closed, thereby energizing solenoids 21 and 216 to effect disengagement of the clutch and closing of throttle 217.

Although only a limited number of embodiments of the invention have been illustrated and described, it is to be expressly understood that the same is not limited thereto, but that various changes may be made in the mechanical details as well as in the design and arrangement of parts illustrated without departing from the spirit and scope of the invention. Reference will, therefore, be had primarily to the appended claims for a definition of the limits of the invention.

What is claimed is:

1. In a clutch control device for motor vehicles, a power device operatively connected to the clutch, means connecting said power device to a source of vacuum to cause said device to disengage the clutch, and means for controlling said connecting means for rendering said vacuum operative to vary the engaging movement of the clutch.

2. In combination with a motor vehicle engine having a fuel induction passage and a clutch therefor including means constantly urging said clutch toward engaged position, power means operable to move said clutch to disengaged position, means for establishing a pressure differential in said power means to effect disengagement of said clutch, and means cooperatively associated with the third mentioned means for modifying the normal rate of engaging movement of said clutch under the urge of the first mentioned means, in accordance with pressure conditions in said induction passage.

3. Apparatus of the character described comprising a power device connected to an operating member of a motor vehicle clutch, control means movable to render said power device operative to move the clutch to inoperative position and to release the clutch elements for movements toward operative position, said control means including means operative as the clutch elements approach fully operative position to retard the movement of such elements and to control the rate of movement of the clutch elements into engagement with each other in accordance with the rate of operation of the throttle of the motor vehicle engine in proportion to the engine speed.

4. A clutch control device comprising two relatively movable members forming a substantially fluid-tight chamber, means connecting one of said members to the clutch whereby the engaging movement of the latter is resisted by the vacuum formed in said chamber during relative movement of said members, means connecting said chamber to a source of vacuum, and means for controlling said connecting means in accordance with the engaging movement of the clutch to vary the resistance of said device to said engaging movement.

5. A pneumatic clutch-operating mechanism for motor cars comprising, in combination, a clutch controlling member, a pneumatically-operated power-developing element operatively connected to said member, automatic means for checking the normal motion of said member at a predetermined point during that portion of its travel which produces a clutch engagement, and a manually controllable device for varying the speed of movement of said member during its travel beyond said predetermined point while completing said clutch engagement which is adjustable by a person while seated in such motor car.

6. Apparatus of the character described comprising a power device operatively connected to a motor vehicle clutch, and a control device for said power device having a member movable in one direction from normal position for effecting actuation of the power device to disengage the clutch, said control device including a second member operable when said first named member is moved back to an intermediate position toward normal position for permitting movement of the operating elements of the clutch approximately to the point of initial engagement and for checking the clutch elements in such position, the first named member of said control device being further movable back toward normal position to effect relatively gradual engagement of the clutch elements.

7. Apparatus of the character described comprising a power device operatively connected to a motor vehicle clutch, and a control device for said power device having a member movable from normal position to an operative position for effecting actuation of the power device to effect disengagement of the clutch, said control device being movable directly from operative position back to normal position to effect relatively rapid disengagement of the operating elements of the clutch, said control device including a second member operable when said first named member is moved to an intermediate position toward normal position to permit movement of the operating elements of the clutch substantially to the point of initial engagement and for checking the clutch elements in such position.

8. Apparatus of the character described comprising a power device operatively connected to a motor vehicle clutch, and a control device for said power device having a member movable from normal position to an operative position for effecting actuation of the power device to effect disengagement of the clutch, said control device being movable directly from operative position back to normal position to effect relatively rapid engagement of the operating elements of the clutch, said control device including a second member operable when said first named member is moved to an intermediate position toward normal position to permit movement of the operating elements of the clutch substantially to the point of initial engagement and for checking the clutch elements in such position wherein the first named member of said control device is movable from said intermediate position toward normal position for effecting relatively slow engagement between the operating elements of the clutch.

9. In a clutch control device for motor vehicles, a power device connected to the clutch and capable of disengaging it, said device comprising relatively movable members forming a fluid pressure chamber, a control device for the power device to cause it to function to disengage the clutch and to release it for movement to engaged position, said control device including an electrically controlled valve for substantially simultaneously connecting said chamber with a source of suction and disconnecting said chamber from the atmosphere, and control means for said power device, including means for causing said valve to vibrate for opening and closing the connection to said source of suction to thereby vary the resistance of the power device to the engaging movement of the clutch.

10. In a clutch control device for motor vehicles, a fluid pressure operated power device connected to the clutch and capable of releasing it, means for connecting the power device to a source of sub-atmospheric pressure, valve means for controlling said connection, and means controlling the operation of said valve means for controlling the degree of vacuum in the power device during the engaging movement of the clutch.

11. In apparatus of the class described, a movable member, resilient means associated with said member, a power device connected to said member for moving the latter in one direction in opposition to said resilient means and capable of releasing it for movement in the other direction by said resilient means, means for connecting the power device to a source of sub-atmospheric pressure, valve means for controlling said connecting means, and control means for said power device including means for opening and closing said valve means during the return movement of said member by said resilient means for varying the resistance of the power device to said return movement.

12. Apparatus of the character described comprising a power device connected to an operating member of a motor vehicle clutch, control means operable for rendering said power device operative to move the clutch to inoperative position and for releasing the clutch elements for movement toward operative position, means operative as the clutch elements approach operative position for retarding the movement of such elements, and means for controlling the rate of movement of the clutch elements into engagement with each other in accordance with pressure present in the intake manifold of the motor vehicle engine whereby clutch element engagement takes place with increased rapidity upon the increase in pressure in the intake manifold.

13. The combination with a motor vehicle engine and a clutch therefor provided with an operating member and having a normal bias to operative position, of a power device connected to the clutch operating member, control means operable for rendering said power device operative to move the clutch to inoperative position and for releasing the clutch elements for movement toward operative position, means operative as the clutch elements approach operative position for retarding the movement of such elements, and means for controlling the rate of movement of the clutch elements into engagement with each other in accordance with the rate of operation of the throttle of the motor vehicle engine in proportion to the engine speed.

14. In a pressure differential operated clutch control device for motor vehicles, a power actuator including cooperable elements, one of which is movable relative to the other, means for connecting one of said elements to a clutch to be operated, and means for controlling the differentials of pressure within said motor to effect the disengagement and engagement of the clutch in such fashion as to simulate a conventional manual operation of the clutch, said last-named means comprising valvular means operative to effect a relatively high rate of change of differentials during the first stage of clutch engagement and to effect a relatively low rate of change of differentials during the last stage of clutch engagement, the differentials during said last stage being determined in accordance with the pressure in the intake passage of the vehicle engine.

15. Apparatus of the character described comprising a power device connected to an operating member of a motor vehicle clutch, control means operable for rendering said power device operative to move the clutch to inoperative position and for releasing the clutch elements for movement toward operative position, means operative as the clutch elements approach operative position for checking the movement of such elements, and means for controlling the rate of movement of the clutch elements into engagement with each other in accordance with the rate of operation of the throttle of the motor vehicle engine in proportion to the engine speed.

16. Apparatus of the character described comprising a power device connected to an operating member of a motor vehicle clutch, and valvular means for controlling the clutch disengaging and engaging operations of said device including means operative to control the engaging movement of the clutch in accordance with the pressure present in the intake manifold of the motor vehicle engine.

17. Apparatus of the character described comprising a differential pressure power device having a movable member connected to an operating member of a motor vehicle clutch, and a control device operable to establish a pressure differential in said power device to move the clutch elements to inoperative position, said control device being normally maintained during operation of the motor vehicle in a position to establish pressure equalization in said power device and including means automatically operative upon initial engagement of the clutch elements for retarding the movement of such elements, said means including a valve for controlling the rate of movement of the clutch elements into operative engagement in accordance with the rate of operation of the throttle of the vehicle engine in proportion to the engine speed.

18. In a motor vehicle having an engine, a clutch, a throttle and operating means for the latter, the combination comprising a power device connected to an operating member of said clutch, control means operable for rendering said power device operative to move the clutch to inoperative position and for releasing the clutch elements for movement toward operative position, said control means including a solenoid, a valve operated thereby and switch means controlled by the throttle operating means, means operative as the clutch elements approach operative position for retarding the movement of such elements, and means for controlling the rate of movement of the clutch elements into engagement with each other in accordance with the rate of operation of the throttle of the motor vehicle engine in proportion to the engine speed.

CHARLES A. BREWER